Patented Feb. 5, 1924.

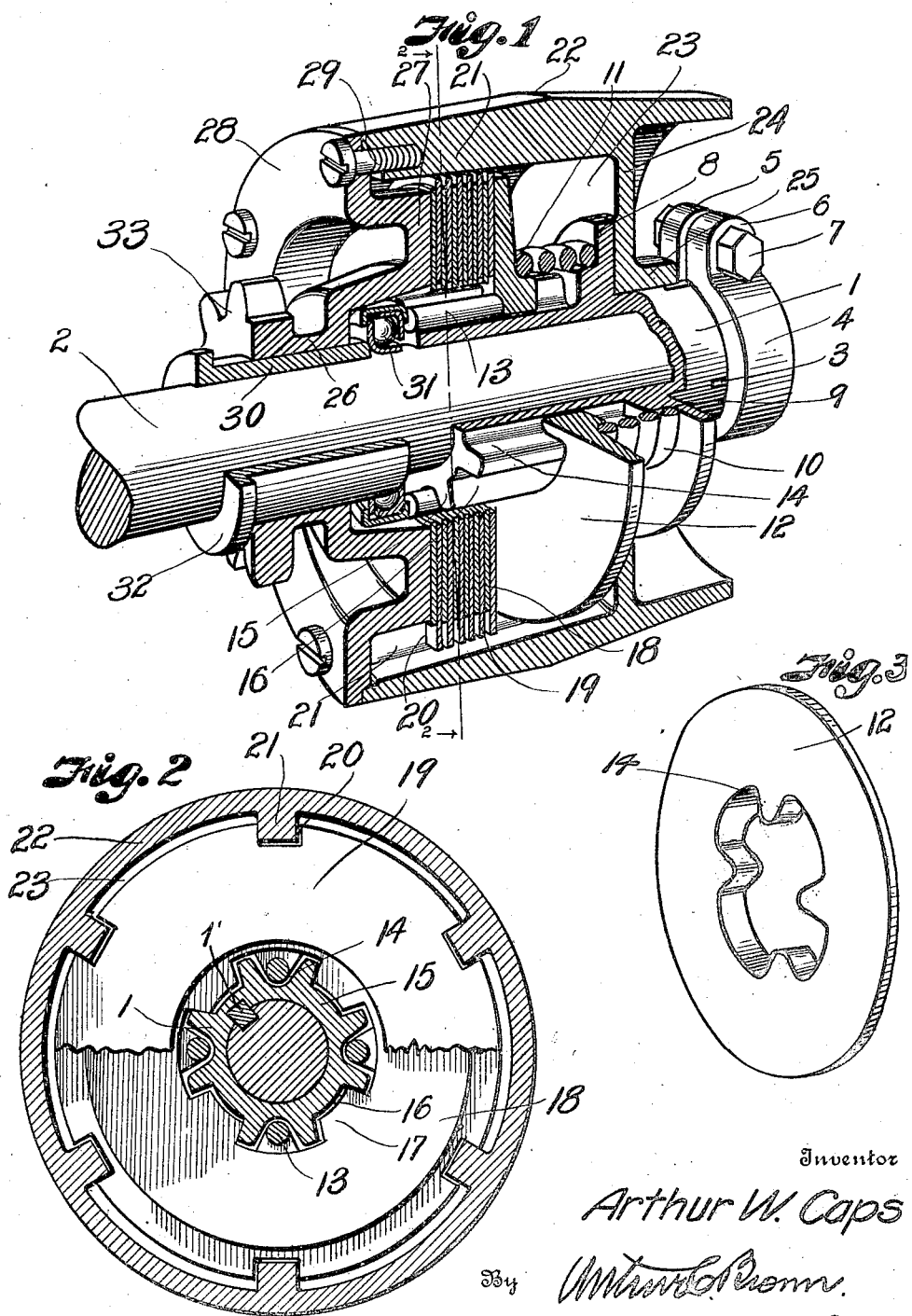

1,482,544

UNITED STATES PATENT OFFICE.

ARTHUR W. CAPS, OF TOPEKA, KANSAS, ASSIGNOR, BY MESNE ASSIGNMENTS, TO O. D. COLLIS, OF CLINTON, IOWA.

CLUTCH.

Application filed September 20, 1920. Serial No. 411,419.

*To all whom it may concern:*

Be it known that I, ARTHUR W. CAPS, a citizen of the United States, residing at Topeka, in the county of Shawnee and State of Kansas, have invented certain new and useful Improvements in Clutches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to clutches and particularly to means for clutching a pulley or the like to a shaft.

The invention contemplates an improved construction of that type of clutch in which interleaving laminations are employed for co-operative frictional engagement to cause a shaft to drive a pulley or the like, or vice versa, the construction being such that the interleaving laminations will normally be in frictional engagement although they may be conveniently disengaged by appropriate mechanism which comprises one of the novel features of my invention.

The novel construction of my invention, together with the mode of operation, will be apparent by reference to the following description in connection with the accompanying drawings, in which—

Fig. 1 is a perspective view in longitudinal vertical section through a pulley and part of the clutch mechanism, the securing sleeve and releaser being shown partly in section and partly in elevation and applied to the shaft.

Fig. 2 is a transverse, sectional view on the line 2—2 of Fig. 1, and

Fig. 3 is a detail perspective view of the applicator disk.

Referring now to the drawings, 1 designates a sleeve mounted upon a drive shaft 2, the sleeve being provided at its ends with a plurality of longitudinal slots 3 so that the end of the sleeve may be contracted about the shaft by the split collar 4, having outwardly projecting lugs 5 and 6, through which a tension bolt 7 passes, the tension bolt being capable of drawing the lugs 5 and 6 together to constrict the bore of the ring 4 and thereby contract the end of the sleeve 1 about the shaft 2 to clamp the sleeve and shaft together. The sleeve also has a key 1' which engages the shaft 2 to provide a positive driving connection between the two elements in addition to the clamping device.

The sleeve 1 is provided with an outwardly projecting flange 8 having an annular shoulder 9 to provide a spring seat for one end of an expansion spring 10. The other end of the spring rests against the spring seat 11, carried by the actuator disk 12 sleeved upon the sleeve 1 and having longitudinal movement with respect thereto to compress the interleaving laminations which constitute the clutching elements of the clutch. The actuator 12 is adapted to be moved to release position by a plurality of independent, longitudinally, extending pins or fingers 13, arranged in circular series about the axis of the shaft 2 and the sleeve 1, the pins or fingers 13 loosely lying in longitudinal grooves 14 in the notched collar 15 integral with the sleeve 1. The notches 14 alternate with notches or recesses 16 in the collar 15 to receive inwardly disposed projections 17 on the disks or laminations 18, which alternate with those designated 19 and constitute one set of clutch members.

The disks or laminations 19 which alternate with those designated 18 are provided with peripheral notches 20, engaged by inwardly projecting ribs or lugs 21, the peripheries of the disks 19 extending slightly beyond the peripheries of the disks 18 to receive such projections, it being apparent that the inner edges of the disks 18 likewise overlap the inner edges of the disks 19 to engage the recesses 16 in the collar 15. The inwardly extending projections or ribs 21 are carried by the driven member illustrated as a pulley and comprising a housing. The rim 22 of the pulley is relatively wide so as to provide an enclosing space 23 for the mechanism just described. The rim of the pulley is provided with a web 24 having a bearing flange or sleeve 25, which is loosely sleeved upon the sleeve 1.

The flange 8 serves as a stop for limiting the longitudinal movement of the bearing flange 25 in one direction and the collar 4 serves as a stop for limiting the movement of the sleeve 25 in the opposite direction, although the sleeve 25 constituting a hub portion for the pulley, permits independent rotation of the sleeve 1 within it when the parts are not clutched together. The web 24 constitutes one end wall of the housing enclosing the space 23. The other end wall of the housing consists of a collar 26 having an offset web 27 serving as an abutment for the interleaving laminations to oppose the thrust caused by the actuator 12. The web 27 carries a circumferential flange 28, which is adapted to be removably secured to the rim 22 of the pulley by fastening devices 29, as clearly indicated in Fig. 1.

The sleeve 26 is mounted upon a releaser constituting a longitudinally slidable, tubular member 30, between the inner end of which and the ends of the pins or fingers 13 is an annulus 31 comprising a ball-race or anti-friction bearing constituting a thrust bearing for the fingers and the end of the releaser 30. The releaser 30 is provided with a flange 32 to be engaged by any sort of a shifting device for moving it longitudinally of the shaft 2, it being understood that the releaser 30 is mounted to loosely slide on said shaft for the purpose of exerting longitudinal thrust against the fingers 13 and the actuator 12, in opposition to the spring 10, to relieve the frictional engagement between the interleaving laminations so that the shaft may rotate independently of the pulley and vice versa, dependent upon which is the driving element. For example, if the shaft 2 is the driving element, the pulley may be released from clutch engagement to remain stationary while the shaft rotates, but if the pulley is the driving element, the pulley may continue to rotate while the shaft 2 remains stationary.

It will be observed that the interleaving laminations are normally in clutched engagement due to the expansive force of the spring 10, but that the two parts, that is, the pulley and shaft, may be disconnected from driving and driven engagement by the releaser 30, which may be shifted longitudinally to exert force as above described to permit the interleaving laminations of the respective sets to rotate idly one between the other.

On the sleeve 26 is a sprocket 33, which may be utilized to drive a sprocket chain in the event that the pulley is not utilized for driving a belt, it being sometimes desirable to substitute the sprocket for the belt or vice versa.

From the foregoing it will be apparent that a device constructed in accordance with my invention may be inexpensively manufactured and assembled, the sleeve 1 being first assembled with the spring interposed between its seat on the flange 8 and the actuator, the interleaving laminations being properly alternated and the thrust bearing 31 being interposed in the space between the tubular member 26 and the fingers 13. The end wall consisting of the tubular member 26, its web 27 and flange 28 is then fastened to the tread of the pulley by the screws 29, which extend into the projections 21, the releaser 30 is then put in position and the entire organization slipped over the shaft 2 so that when the outer end of the sleeve 1 is clamped about the shaft 2 through the medium of the split ring clamp 4, the clutch will be ready to function. Since the spring has an inherent tendency to expand, the clutch will be applied normally but released when the releaser 30 is actuated by suitable means, causing it to shift longitudinally against the thrust bearing 31 to force the actuator longitudinally in opposition to the spring 10.

In the event that it is desirable to have access to the interior of the pulley for the purpose of inspection or repairs, the mechanism may be readily accessible upon taking out the fastening devices 29.

Therefore, the parts may be easily assembled or disassembled as the occasion may demand, it being apparent that the device is simple in construction and that an efficient clutch mechanism is provided.

What I claim and desire to secure by Letters Patent is:

1. In combination, a shaft, a sleeve on said shaft having a split end, a contractible collar about the split end to contract the same into frictional engagement with the shaft, an outstanding spring seat carried by the sleeve, a pulley having a hub interposed between the spring seat and the collar whereby the hub may have rotative movement with respect to the shaft but be held against longitudinal movement, a plurality of interleaving clutch laminations carried by the pulley and the sleeve respectively, one end wall of the pulley serving as an abutment, a longitudinally movable, clutch actuator on the sleeve, an expansion spring interposed between the actuator and the spring seat, and a longitudinally shiftable releaser sleeve on the shaft for exerting pressure against the actuator in opposition to the expansive force of the spring.

2. In combination, a shaft, a sleeve rigid on said shaft, a pulley rotatable about the sleeve and having clutch disks or laminations in spaced relation, a collar on the sleeve carrying clutch disks or laminations interleaving with those on the pulley, grooves in said collar, a spring-pressed actuator for forcing the respective laminations into frictional contact, pins in the grooves for operating the actuator, a thrust bearing about the shaft and bearing against the ends of the pins, and a releaser sleeve on said shaft and projecting into the pulley hub for engagement with the thrust bearing to exert pressure against the pins and against the actuator to move said actuator out of functional position.

In testimony whereof I affix my signature.

ARTHUR W. CAPS.